(12) United States Patent
Sarkar et al.

(10) Patent No.: US 9,392,622 B2
(45) Date of Patent: Jul. 12, 2016

(54) SYSTEM AND METHOD FOR CONFIGURING A RADIO ACCESS NETWORK

(71) Applicant: TELEFONAKTIEBOLAGET L M ERICSSON (PUBL), Stockholm (SE)

(72) Inventors: Debasish Sarkar, Irvine, CA (US); Ayan Sen, Gurgaon (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 218 days.

(21) Appl. No.: 13/893,474

(22) Filed: May 14, 2013

(65) Prior Publication Data

US 2014/0341181 A1 Nov. 20, 2014

(51) Int. Cl.
*H04W 74/08* (2009.01)
*H04W 72/12* (2009.01)
*H04W 74/00* (2009.01)

(52) U.S. Cl.
CPC .......... *H04W 74/0833* (2013.01); *H04W 72/12* (2013.01); *H04W 74/006* (2013.01)

(58) Field of Classification Search
CPC ............ H04W 40/36; H04W 74/0833; H04W 74/008; H04W 74/085; H04W 72/12
USPC .................................................. 370/331, 329
See application file for complete search history.

(56) References Cited

U.S. PATENT DOCUMENTS

2011/0007700 A1* 1/2011 Aminaka .......... H04W 72/0406
370/329
2011/0096671 A1* 4/2011 Lindstrom .......... H04W 76/027
370/242
2012/0002613 A1* 1/2012 Kishiyama ........ H04W 74/0866
370/329
2012/0052898 A1* 3/2012 Hegge ................... H04W 74/04
455/511

FOREIGN PATENT DOCUMENTS

| SE | WO2010002301 A1 * | 1/2010 | ............ H04W 74/08 |
| WO | WO 2008/041916 A1 | 4/2008 | |
| WO | WO 2010/002301 A1 | 1/2010 | |

OTHER PUBLICATIONS

Choi, S. et al. Automatic configuration of random access channel parameters in LTE systems. Wireless Days (WD), 2011 IFIP, IEEE, Oct. 10, 2011, pp. 1-6.

* cited by examiner

*Primary Examiner* — Wei Zhao
*Assistant Examiner* — Abdeltif Ajid

(57) ABSTRACT

In accordance with one embodiment of the present disclosure, a method for managing communication in a wireless network includes determining a first value indicating a level of use for a scheduled data channel for one or more of a plurality of sectors served by a first base station and determining a second value indicating a level of use for a random access channel for one or more of the plurality of sectors served by the first base station. The method also includes selecting a respective subframe for random access transmissions for each of the sectors served by the first base station based on the first value and the second value. Additionally, the method includes transmitting configuration information to the first base station. The configuration information indicates a subframe selected for each of the sectors.

21 Claims, 5 Drawing Sheets

SYSTEM AND METHOD FOR CONFIGURING A RADIO ACCESS NETWORK

TECHNICAL FIELD OF THE INVENTION

This disclosure relates in general to wireless communication and, more particularly, to configuring a radio access network of a wireless communication system.

BACKGROUND OF THE INVENTION

The introduction of a variety of new communication services and applications in recent years has led to a significant increase in the use of wireless communication services. The resulting increase in wireless traffic has placed significant strains on the capacity of modern communication systems, resulting in failed connection attempts, dropped calls, and other problems for users. Consequently, it has become critical for network designers and operators to optimize the configuration and operation of wireless networks to accommodate high levels of traffic.

Many wireless communication networks are designed to utilize both scheduled data transmissions, in which wireless devices transmit data to a radio access network in scheduled time slots, and random access transmissions, in which wireless devices transmit data to the radio access network at arbitrary, unscheduled times. In such networks, specific transmission resources (e.g., time and frequency resources) may be allocated respectively to these different types of transmissions. Additionally, these different types of transmissions may be used for specific purposes.

For example, in networks that implement the Long Term Evolution (LTE) communication standard, a wireless communication device typically utilizes random access transmissions to initiate radio links with the wireless network (e.g., when the device is turned on, after a handover to a new cell of the wireless network) and uses scheduled transmissions for the transmission of user data once a radio link has been established with the network. As a result, the wireless device's ability to perform certain functions in a particular wireless network may be limited by how transmission resources are allocated in the network to the various types of transmissions.

SUMMARY OF THE INVENTION

In accordance with the present disclosure, certain disadvantages and problems associated with wireless communication have been substantially reduced or eliminated. In particular, certain devices and techniques for providing resource allocation in a wireless communication system are described.

In accordance with one embodiment of the present disclosure, a method for managing communication in a wireless network includes determining a first value indicating a level of use for a scheduled data channel for one or more of a plurality of sectors served by a first base station and determining a second value indicating a level of use for a random access channel for one or more of the plurality of sectors served by the first base station. The method also includes selecting a respective subframe for random access transmissions for each of the sectors served by the first base station based on the first value and the second value. Additionally, the method includes transmitting configuration information to the first base station. The configuration information indicates a subframe selected for each of the sectors.

In accordance with another embodiment of the present disclosure, a-management apparatus for managing communication in a wireless network includes a processor and a communication interface. The processor is adapted to determine a first value indicating a level of use for a scheduled data channel for one or more of a plurality of sectors served by a first base station and determine a second value indicating a level of use for a random access channel for one or more of the plurality of sectors served by the first base station. The processor is also adapted to select a respective subframe for random access transmissions for each of the sectors served by the first base station based on the first value and the second value. The communication interface is adapted to transmit configuration information to the first base station. The configuration information indicates a subframe selected for each of the sectors.

In accordance with yet another embodiment of the present disclosure, a system for managing wireless communication includes a managing node and a first base station. The managing node is adapted to determine a first value indicating a level of use for a scheduled data channel for one or more of a plurality of served by the first base station and determine a second value indicating a level of use for a random access channel for one or more of the sectors served by the first base station. The managing node is also adapted to select a respective subframe for random access transmissions for each of the sectors served by the first base station based on the first value and the second value. Additionally, the managing node is adapted to transmit configuration information to the first base station. The configuration information indicates a subframe selected for at least a first sector served by the first base station. The first base station is adapted to receive the configuration information and to set a respective subframe for random access transmissions in the first sector based on the received configuration information.

Important technical advantages of certain embodiments of the present invention include optimizing the allocation of transmission resources between scheduled transmissions and random access transmissions. Particular embodiments may reduce the interference caused by random access transmissions made in cells neighboring one another, maximize the amount of transmission resources available for the transmission of user data, and/or otherwise improve the allocation of transmission resources between various types of transmission. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
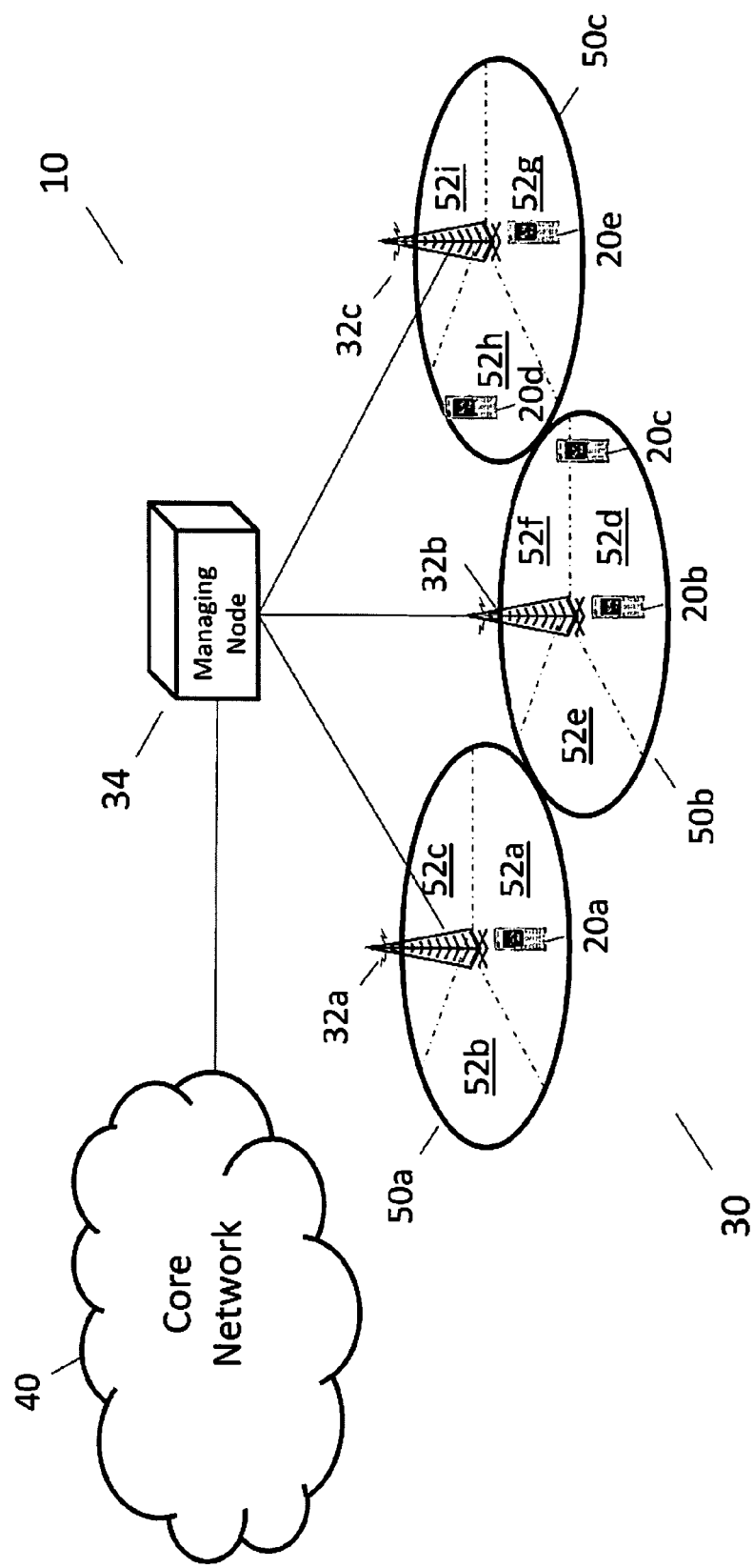
FIG. 1 illustrates a particular embodiment of a wireless communication system in which the described solutions may be implemented.

FIG. 1 illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. Access network 30 includes one or more managing nodes 34 that manage multiple base stations 32 each providing provide service to users in a particular cell 50. By dynamically configuring base stations 32 serving neighboring cells 50, managing node 34 may help optimize the allocation of transmission resources in the cells 50 served by the relevant base stations 32.

In general, wireless communication system 10 provides wireless communication service to one or more wireless communication devices 20 operating within a plurality of cells 50, each representing a geographic area associated with wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine-type (MTC) and/or machine-to-machine (M2M) communication. For example, wireless communication device 20 may represent a wireless meter or sensor, a digital billboard, a wireless-capable appliance, or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. For example, in the illustrated embodiment, access network 30 includes managing node 34 and one or more base stations 32. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40. Although FIG. 1 illustrates, for the sake of simplicity, an embodiment in which access network 30 includes a single managing node 34, wireless communication system 10 may include any suitable number of managing nodes 34 with the responsibility for managing the various base stations 32 of access network 30 divided among the multiple managing nodes 34 in any appropriate manner.

Base stations 32 communicate wirelessly with wireless communication devices 20 to facilitate wireless communication for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), an access point, or any other suitable element capable of communicating with wireless communication devices 20 wirelessly. In particular embodiments, base stations 32 may each be responsible for serving a cell 50 that is divided into a plurality of different sectors 52 that may each be configured independently of one another.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

In operation, wireless communication system 10 provides telecommunication service to wireless communication device 20. In order to optimize service in the various sectors 52 served by a particular base station 32, managing node 34 may configure the relevant base station 32 to prevent excessive interference between the associated sectors 52. In particular embodiments, this configuration may include setting, for the relevant base station 32, parameters that are associated with random access transmissions in the cells served by the relevant base stations 32.

For example, in the illustrated example, managing node 34 configures a particular base station (for purposes of this example, base station 32a) with a random access parameter for each sector 52 served by base station 32a. Each of these random access parameters specifies when random access transmissions will occur in a corresponding sector 52 served by base station 32a. As one example, in certain embodiments that implement LTE, base station 32a may be configured with a Physical Random Access CHannel (PRACH) parameter (e.g., a "PRACHConfigIndex") for each sector 52 served by base station 32a. This PRACH parameter specifies a subframe during which transmissions by wireless communication device 20 are permitted on a PRACH of the relevant sector 52. In particular embodiments, this subframe represents one of ten equal subdivisions of a radio frequency frame that governs the timing of uplink and downlink transmissions within the relevant sectors 52. In certain embodiments, this PRACH parameter may be set to one of a predetermined set of values (e.g., "3," "4," and "5") that are each associated with a respective subframe (e.g., subframe 1, subframe 4, and subframe 7).

Once the random access parameter for a particular sector 52 is set, base station 32a may communicate information indicating the value and/or the associated subframe to wireless communication devices 20 in the relevant sectors 52 (e.g., as part of system information broadcast by base station 32a). Base station 32a and its served wireless communication device 20 may then determine the appropriate subframe in which random access transmissions should be made within the corresponding cell based on the value and/or the subframe to which it is mapped.

To optimize operation within the sectors 52 served by base station 32a, particular embodiments of managing node 34 may set the random access parameter dynamically based, for example, on statistical analysis of certain performance metrics and other considerations, such as the distance of one or more served wireless communication devices 20 from base station 32a. Instead of implementing a fixed configuration of the random access parameter for base station 32a, managing node 34 may consider various factors indicative of the level of use of a random access channel in one or more of sectors 52 served by base station 32a and the level of use of a scheduled data channel in one or more of sectors 52.

In general, managing node 34 may consider any suitable metrics indicating in any appropriate manner a level of use of the scheduled data channel and a level of use of the random access channel. For instance, in the illustrated example, managing node 34 considers a transmission resource utilization value for one or more of sectors 52, a session time value for one or more sectors 52, and a connected user quantity for one or more sectors 52 when configuring base station 32a, either for purposes of determining a level of use of the scheduled data channel (that can subsequently be used to determine the appropriate configuration) or in determining the appropriate configuration directly. Additionally, in the illustrated example, managing node 34 considers an access attempt quantity for one or more sectors 52 and a handover attempt quantity for one or more sectors 52, either for purposes of determining a level of use of the random access channel (that can subsequently be used to determine the appropriate configuration) or in determining the appropriate configuration directly.

In the illustrated example, the transmission resource utilization value indicates a utilization rate for uplink transmission resources in one or more of the plurality of cells 50. This transmission resource utilization value may represent an uplink physical resource block (PRB) utilization, in terms of a quantity utilized, a percentage utilized, or any other appropriate type of value indicating the current utilization of physical resource blocks in the relevant cell(s). The session time value indicates an amount of time associated with a plurality of sessions that have occurred in one or more of sectors 52. For example, the session time value may represent the total amount of connected time for all communication sessions served in the relevant sector(s) 52 or for any suitable subset of sessions (e.g., all voice communication sessions). The connected user quantity indicates a number of users that connected to one or more of sectors 52 over a particular period of time. The connected user quantity may represent a count of all connected users or of any subset of those users (e.g., those users that transmitted or received more than a minimum threshold amount of data during a particular time period) in one or more of sectors 52.

Furthermore, in the illustrated example, the access attempt quantity indicates a number of access attempts that have occurred in the relevant sectors 52 over a predetermined time period. For example, this quantity may represent a count of all the Radio Resource Control (RRC) Connection Request messages received by the base station 32a from new users in the relevant sectors 52 during a particular time period. The handover attempt quantity indicates a number of handover attempts that have occurred in the relevant sectors 52 over a particular time period. Depending on the configuration of managing node 34, all of these metrics may be determined on an aggregate level for all sectors 52 served by base station 32a or may be determined separately for each sector 52.

Managing node 34 may collect these metrics directly from base stations 32 or may receive them from other elements of wireless communication system 10, such as a self-organizing network (SON) server configured to collect Operations Support Systems (OSS) statistics. In particular embodiments, managing node 34 may itself represent a SON server collecting OSS statistics and may itself be responsible for generating these metrics. Once managing node 34 has obtained the metrics, managing node 34 may then compare the metrics to individual thresholds or may combine the metrics in any suitable manner and compare one or more combined metrics to respective thresholds to determine an appropriate configuration for the base station 32a. Managing node 34 may weight any of the metrics and/or the outcome of the threshold comparison for any of the metrics or groups of metrics (e.g., random access channel utilization metrics vs. scheduled data channel utilization metrics) to appropriately reflect the desired impact of individual metrics on the overall determination.

Managing node 34 may then set the random access channel parameter based on the selected configuration. For instance, returning to the example above in which managing node 34 considers: (a) an uplink PRB utilization, (b) a number of access attempts, (c) a number of handover attempts, (d) a session time, and (e) a number of connected users, managing node 34 may utilize corresponding thresholds for each of these metrics, including respectively: (i) a $Thresh_{UL\_PRB\_Utilization}$, (ii) $Thresh_{Access\_Attempts}$, (iii) a $Thresh_{HO\_Attempts}$ (iv) a $Thresh_{Session\_Time}$, and (v) a $Thresh_{Connected\_Users}$. Additionally, managing node 34 may utilize a hysteresis time ($Time_{Hysteresis}$) to establish a minimum amount of time that any changes with respect to the various thresholds must be maintained before a re-configuration of base station 32a will be triggered.

Thus, in the illustrated example, if the UL PRB Utilization value>$Thresh_{UL\_PRB\_Utilization}$ the Session Time value>$Thresh_{Session\_Time}$, and the Number of Connected Users>$Thresh_{Connected\_Users}$ for all sectors 52 of base station 32a for an amount of time>$Time_{Hysteresis}$, managing node 34 may characterize the relevant sectors 52 as "Capacity Limited." Accordingly, managing node 34 may set the random access parameter for each of the relevant sectors 52 to a predetermined value or to one of a set of predetermined values for "Capacity Limited" sectors 52.

If the configured sectors 52 are determined to be "Capacity Limited," the selected value may be chosen to minimize the interference between random access transmissions (e.g., PRACH transmissions) in one or more sectors 52 and scheduled data transmissions (e.g., PUSCH transmissions) in another sector 52. Thus, in particular embodiments, at least one of the subframes configured for random access transmissions in these sectors 52 is shared by all the sectors 52. For example, in embodiments in which the random access parameter represents a PRACH Configuration Index, managing node 34 may set the PRACH Configuration Index to a value of "3" for all sectors 52 of base station 32a. This will result in wireless communication devices 20 using the same subframe for random access transmissions in all sectors 52 served by base station 32a, and no wireless communication devices 20 making random access transmissions during the same subframe as scheduled data transmissions are being made in one of the neighboring sectors 52.

Alternatively, in the illustrated example, if the Access Attempts value>$\text{Thresh}_{Access\ Attempt}$, and the Handover Attempt value>$\text{Thresh}_{HO\ Attempt}$ for all of the relevant sectors 52 for an amount of time>$\text{Time}_{hysteresis}$, then managing node 34 may characterize the relevant sectors 52 as "Interference Limited." Accordingly, managing node 34 may set the random access parameter for each sector 52 served by base station 32a to a different value so that none of the subframes used for random access transmissions in the relevant sectors 52 overlap. The selected values may be chosen to minimize the interference between random access transmissions (e.g., PRACH transmissions) in one sector 52 and those in another sector 52 even if it results in increased interference between random access transmission in one sector 52 and scheduled data transmissions in another sector 52. For example, in embodiments in which the random access parameter represents a PRACH Configuration Index, managing node 34 may set the PRACH Configuration Index for a group of three sectors 52 served by base station 32a to the values "3," "4," and "5" respectively. This will result in wireless communication devices 20 using different subframes for random access transmissions in each of these sectors 52, and no wireless communication devices 20 making random access transmissions during the same subframe as random access transmissions are being made in one of the neighboring sectors 52 served by base station 32a.

In particular embodiments, the metrics involved can be dynamically calculated and the random access parameter is dynamically adjusted depending on various weightings assigned to interference and capacity (e.g., to the relevant significance placed on avoiding "Capacity Limited" and "Interference Limited" scenarios). This may be helpful in providing different configurations for sectors 52 experiencing different mixes of user behavior, such as sectors 52 having shorter average session times versus sectors 52 having longer average session time. Similarly, this may advantageously allow a different configuration to be configured for sectors 52 with high-mobility users (which will typically lead to a high number of access attempts) than is configured for sectors 52 having mostly limited-mobility users. A network service provider may have the option of assigning designated weightings to capacity and interference, and managing node 34 may be able to modify the random access parameters dynamically.

Once managing node 34 has established the appropriate configuration or configurations for the sectors 52 served by base station 32a, managing node 34 may communicate configuration information to base station 32a indicating the relevant configuration(s). For example, managing node 34 may transmit configuration messages to base station 32a over a Northbound Interface (Itf-N) in certain LTE implementations. Base station 32a may then configure itself based on the received configuration information. In particular embodiments, this may involve setting a random access parameter for each of the sectors 52 served by base station 32a to a value indicated by the received configuration information. Base station 32a may also communicate the configuration of sectors 52 to wireless communication devices 20 served by base station 32a. In particular embodiments, base station 32a may communicate the configuration as part of system information base station 32a broadcasts to wireless communication devices 20 operating in the cell 50 served by base station 32a.

After any necessary re-configuration of base station 32a based on the received configuration information and after any appropriate information has been communicated to wireless communication devices 20 served by base station 32a, wireless communication devices 20 operating in sectors 52 served by base station 32a may make random access and scheduled data transmissions in accordance with the configuration of their respective sector 52. For instance, in the illustrated example, wireless communication device 20a operating in sector 52a may then make random access transmissions on a random access channel provided in sector 52a in a particular subframe (or subframes) designated for sector 52a by the configuration information transmitted by managing node 34 to base station 32a.

Base station 32a may also schedule wireless communication devices 20 operating in sectors 52 served by base station 32a to make scheduled data transmissions as well. Depending on the design and/or configuration of base station 32a, base station 32a may be permitted to schedule transmissions in any subframe or only those subframes not designated for random access transmissions. Thus, in particular embodiments, base station 32a may be able to schedule wireless communication device 20a to make scheduled data transmissions in sector 52a during any subframe. In alternative embodiments, base station 32a may only be able to schedule wireless communication device 20a to make scheduled data transmission in sector 52a during subframes that are not designated by the current configuration of sector 52a for random access transmissions in sector 52a. More generally, however, after any appropriate re-configuration of base station 32a wireless communication devices 20 can make random access transmissions and scheduled transmissions in accordance with the current configuration of the sector 52 in which they are operating, and base station 32a will likewise receive random access transmissions and scheduled data transmissions from wireless communication devices 20 in accordance with the relevant sector configurations.

By using the described techniques to dynamically optimize the configuration of sectors 52, particular embodiments of wireless communication system 10 may be able to optimize the capacity of a cell site while efficiently managing the interference occurring within and/or between sectors 52. In certain embodiments, this may lead to improved reception of random access transmissions (e.g., greater success decoding Random Access CHannel (RACH) preambles), resulting in improved accessibility and more reliable handover techniques. As a result, certain embodiments of wireless communication system 10 may provide numerous operational benefits. Nonetheless, specific individual embodiments of wireless communication system 10 may provide some, none, or all of these benefits.

Figure 2:
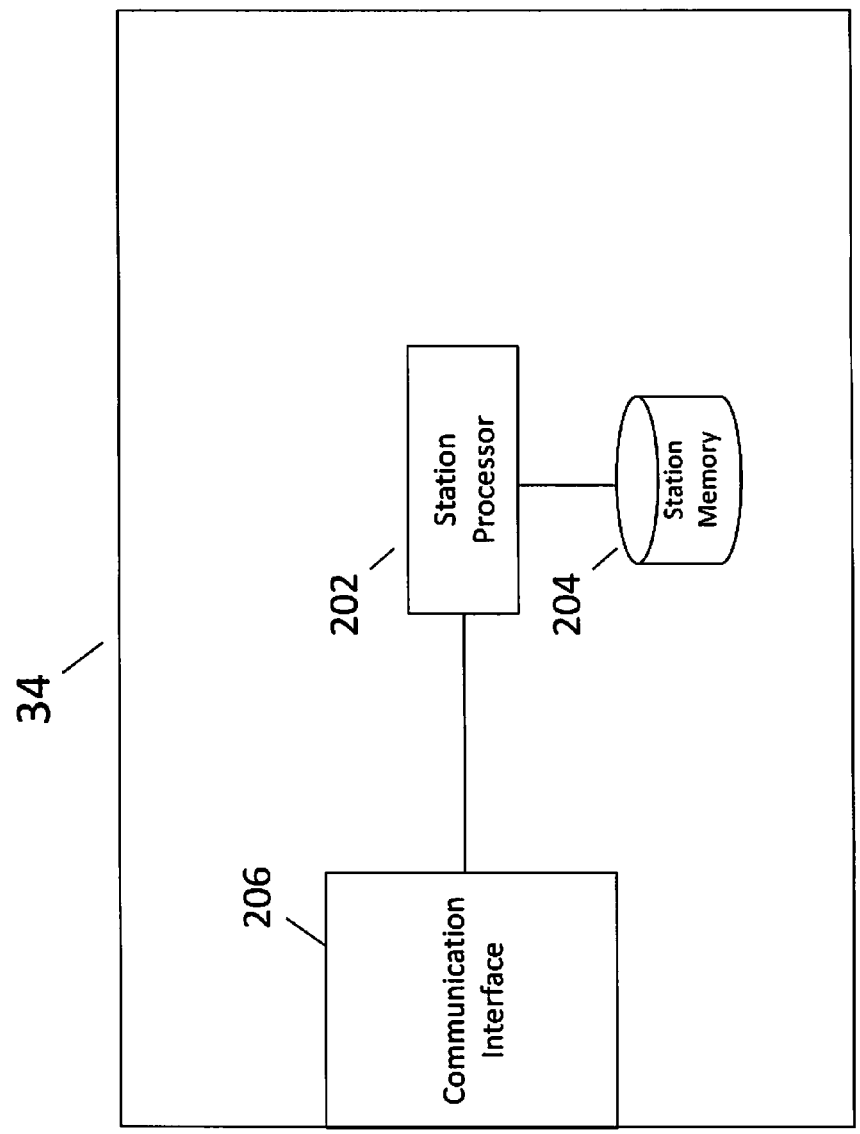
FIG. 2 is a block diagram illustrating a particular embodiment of a managing node that may be utilized in the wireless communication system of FIG. 1.

FIG. 2 is a block diagram illustrating in greater detail the contents of a particular embodiment of managing node 34 that may be configured to set random access parameters for managed base stations 32 as described above. Managing node 34 may represent any suitable element of a radio access network capable of providing the described functionality. As shown in FIG. 2, the example embodiment of managing node 34 includes a node processor 202, a node memory 204, and a communication interface 206.

Node processor 202 may represent or include any form of processing component, including dedicated microprocessors, general-purpose computers, or other forms of electronic circuitry capable of processing electronic information. Examples of node processor 202 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of managing node 34 that includes a single node processor 202, managing node 34 may include any number of node processors 202 configured to interoperate in any appropriate manner.

Node memory 204 stores information obtained by managing node 34 and used during operation, including any metrics collected or generated by managing node 34. Node memory 204 may also store processor instructions for node processor 202, historical metrics, default parameters, and/or any other data utilized by managing node 34 during operation. Node memory 204 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2, node memory 204 may include one or more physical components local to or remote from managing node 34.

Communication interface 206 comprises electronic circuitry and other components suitable to permit managing node 34 to communicate with base stations 32. For example, in embodiments in which managing node 34 represents a node separate from the radio elements of access network 30 (e.g., a radio network controller), communication interface 206 may represent circuitry capable of communicating over a wireline connection between managing node 34 and base stations 32. In such embodiments, communication interface 206 may represent or include circuitry enabling managing node 34 to communicate with base stations 32 over a proprietary interface or a standardized interfaces, such as an Itf-N interface connecting managing node 34 to a managed base station 32.

Figure 3:
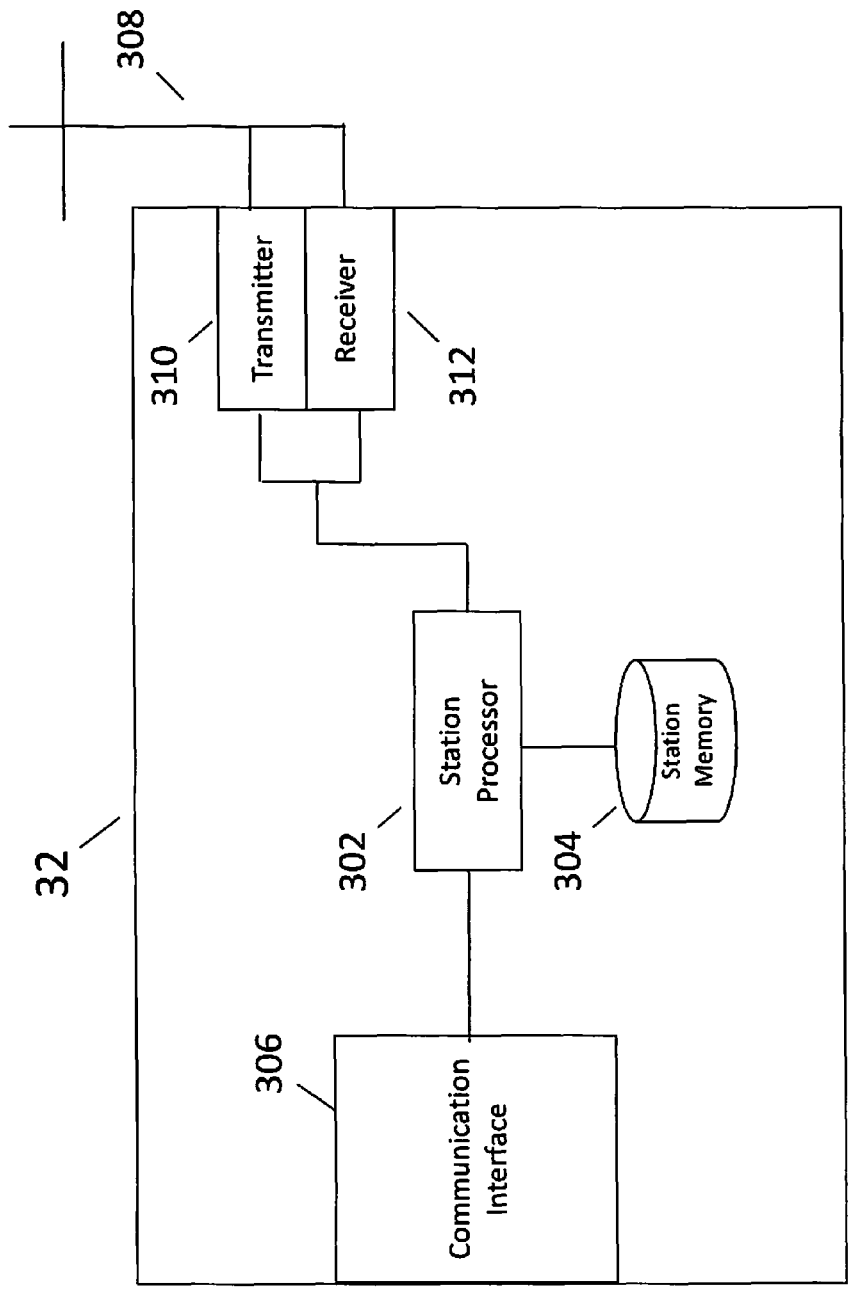
FIG. 3 is a block diagram illustrating a particular embodiment of a base station that may be utilized in the wireless communication system of FIG. 1.

FIG. 3 is a block diagram illustrating in greater detail the contents of a particular embodiment of base station 32 that may be configured by managing node 34. Base stations 32 may include any combination of hardware and/or software suitable to provide the described functionality. As shown in FIG. 3, the example embodiment of base station 32 includes a station processor 302, a station memory 304, a communication interface 306, an antenna 308, a transmitter 310, and a receiver 312.

Station processor 302 may represent or include any form of processing component, including dedicated microprocessors, general-purpose computers, or other forms of electronic circuitry capable of processing electronic information. Examples of station processor 302 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of base station 32 that includes a single station processor 302, base station 32 may include any number of node processors 302 configured to interoperate in any appropriate manner.

Station memory 302 stores configuration information obtained by base station 32. Station memory 302 may also store processor instructions for node processor 302, coding algorithms, transmission parameters, and/or any other data utilized by base station 32 during operation. Station memory 302 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, station memory 302 may include one or more physical components local to or remote from base station 32.

Communication interface 306 comprises electronic circuitry and other components suitable to permit base station 32 to communicate with other radio access nodes and/or other elements of access network 30 and core network 40. For example, in embodiments in which base station 32 exchanges coordination information with other network nodes in access network 30, communication interface 306 may represent circuitry capable of communicating over an X2 interface between base station 32 and other nodes of access network 30.

Antenna 308 represents any suitable conductor capable of receiving and transmitting wireless signals. Transmitter 310 transmits radiofrequency (RF) signals over antenna 308, and receiver 312 receives from antenna 308 RF signals transmitted by wireless communication devices 20. Although the example embodiment in FIG. 3 includes certain numbers and configurations of antennas, receivers, and transmitters, alternative embodiments of base station 32 may include any suitable number of these components. Additionally, transmitter 310, receiver 312, and/or antenna 308 may represent, in part or in whole, the same physical components. For example, particular embodiments of base station 32 include a transceiver representing both transmitter 310 and receiver 312.

Figure 4A:
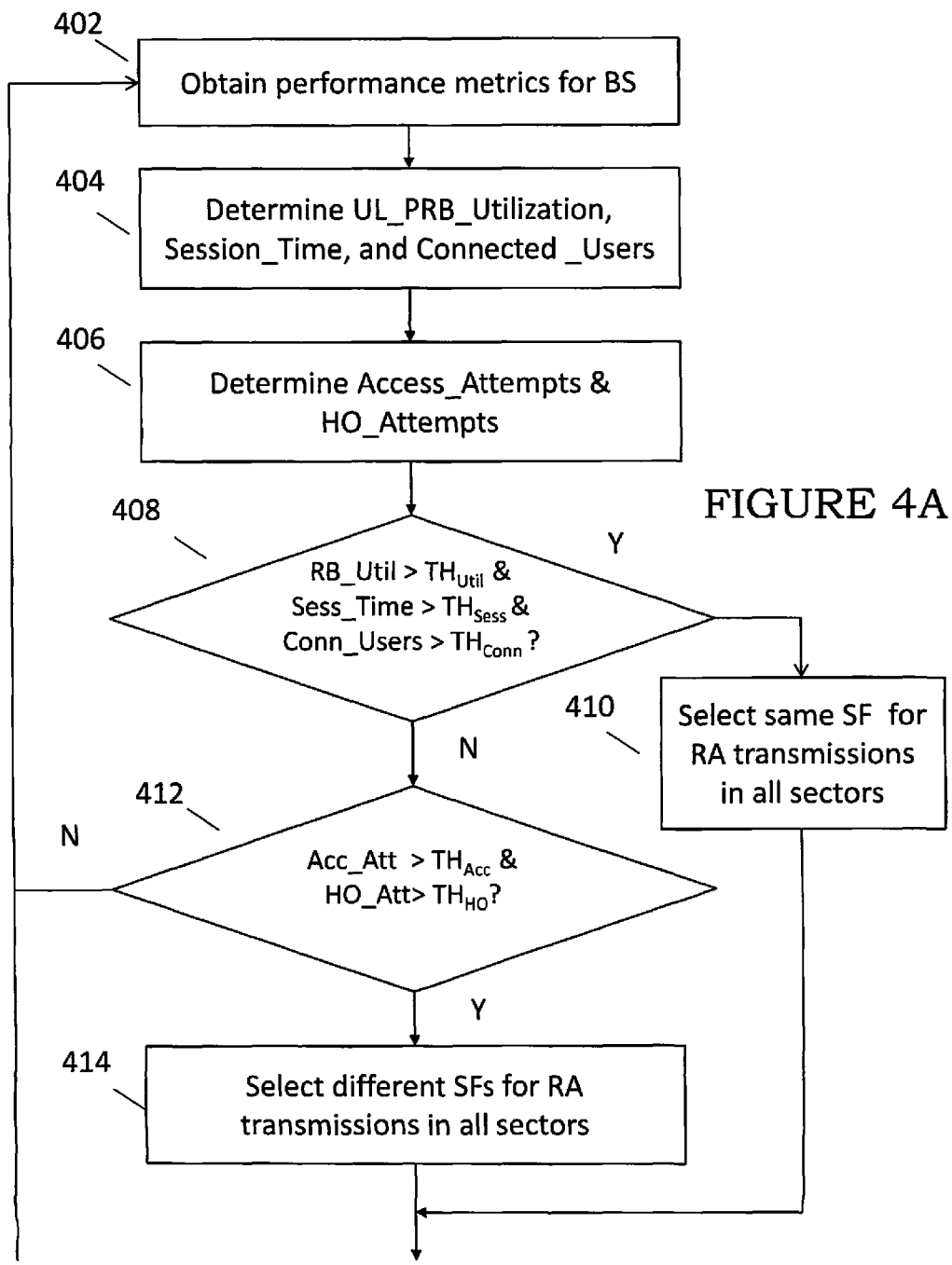
FIGS. 4A-4B are a flowchart showing example operations of particular embodiments of the managing node and the base station.
Figure 4B:
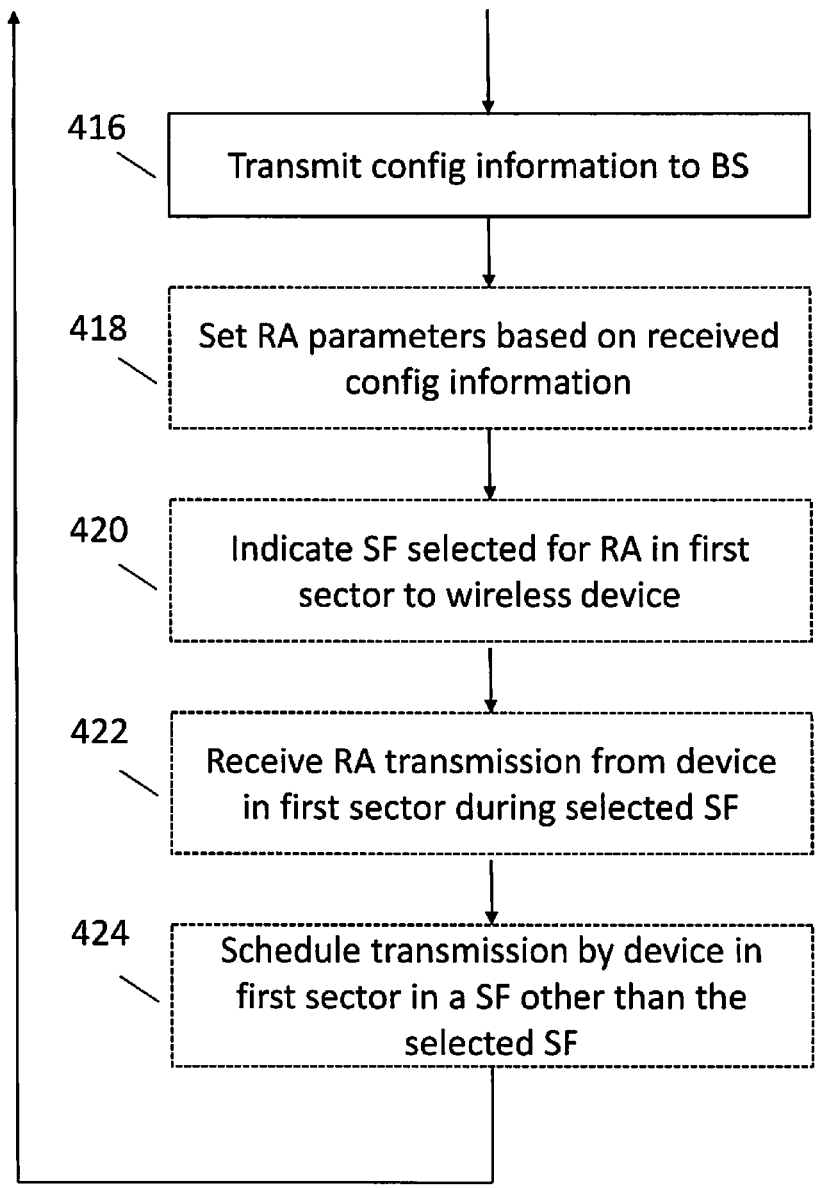

FIGS. 4A-4B are a flowchart illustrating example operation of particular embodiments of managing node 34 in configuring base stations 32. More specifically, FIGS. 4A-4B shows operation of an example embodiment of managing node 34 in configuring a random access parameter of a particular base station 32 (for purposes of this example, base station 32a) to facilitate coordinated operation between sectors 52 served by the relevant base station 32. The steps illustrated in FIGS. 4A-4B may be combined, modified, or deleted where appropriate. Additional steps may also be added to the example operation. Furthermore, the described steps may be performed in any suitable order.

In the illustrated example, operation begins, at step 402, with managing node 34 obtaining performance metric data pertaining to the operation of base station 32a (BS). Managing node 34 may receive this data from base station 32a, receive the data from another element of wireless communication system 10 responsible for collecting and/or storing performance data, and/or collect the data itself. As explained above, in particular embodiments, the obtained data may include, or managing node 34 may determine based on this obtained performance metric data, data indicative of a level of use of one or more scheduled data channels served by base station 32a and data indicative of a level of use of a random access channel served by base station 32a. Thus, in the illustrated example, managing node determines a first set of one or more values indicating a level of use for a scheduled data channel for one or more of a plurality of sectors 52 served by base station 32a (in this example, sectors 52a-c) at step 404 and determines a second set of one or more values indicating a level of use for a random access channel for one or more of the plurality of sectors 52a-c served by the first base station 32a at step 406. For instance, in the illustrated example, the level of use of the scheduled data channel is indicated by a transmission resource utilization value (RB_Util), a session time value (Sess_Time), and/or a connected user quantity (Conn_Users) for each of sectors 52a-c, and the level of use of the random access channel is indicated by an access attempt quantity (Acc_Att) and a handover attempt quantity (HO_Att) for each of sectors 52a-c.

Once managing node 34 has obtained the performance metric data and determined the relevant values, managing node 34 selects a respective subframe (SF) for random access (RA) transmissions for each sector 52 served by base station 32a. Managing node 34 may select a subframe for random access transmissions for the various sectors 52a-c in any appropriate manner based on the performance metric data. FIG. 4A illustrates an example of this process in steps 408-414.

In the illustrated example, managing node 34 compares the first value(s) indicating the level of use of the scheduled data channel to one or more scheduled data thresholds at step 408. For example, managing node 34 may compare a transmission resource utilization value (RB_Util) for each of the sectors 52a-c served by base station 32a to a resource utilization threshold ($TH_{Util}$), a session time value for each of sectors 52a-c to a session time threshold ($TH_{Sess}$), and a connected user quantity for each of sectors 52a-c to a connected user threshold ($TH_{Conn}$). If managing node 34 determines that the first value(s) for one, or a predetermined number, of sectors 52a-c exceeds their respective thresholds, managing node 34 may decide that sectors 52a-c of base station 32a are "Capacity Limited."

Accordingly, managing node 34, at step 410, selects the same subframe to be used for random access transmissions in at least one of sectors 52a-c served by base station 32a. In certain embodiments, managing node 34 may select a subframe for random access transmissions in all sectors 52a-c served by base station 32a whenever managing node 34 changes the configuration of base station 32a. In other embodiments, managing node 32 may select a subframe only for a sufficient number of sectors 52a-c (e.g., for a single one of sectors 52a-c) to achieve the desired change in configuration. Moreover, in particular embodiments, managing node 34 selects the same subframe for use in sectors 52a-c by selecting the same value for a particular random access parameter for each of sectors 52a-c (e.g., by selecting a value of "3" for the PRACHConfigIndex for each of sectors 52a-c). If instead, managing node 34 determines that the relevant scheduled data use values do not exceed the relevant thresholds in any (or in the predetermined number) of sectors 52a-c, operation of managing node 32 may advance to step 412 as shown in FIG. 4A.

At step 412, managing node 34 compares the second value(s) indicative of a level of use of the random access channel to one or more random access thresholds. For instance, in the illustrated example, managing node 34 compares an access attempt quantity (Acc_Att) for each of the different sectors 50a-c served by base station 32a to an access attempt threshold (TH_Acc) and a handover attempt quantity (HO_Att) to a handover attempt threshold ($TH_{HO}$). If managing node 34 determines that the values for one, or a predetermined number, of sectors 52a-c exceeds their respective thresholds, managing node 34 may decide that the sectors 50 of base station 32a are "Interference Limited." Accordingly, managing node 34, at step 414, selects different subframes to be used for random access transmissions in each of the sectors 52a-c served by base station 32a. In particular embodiments, managing node 34 may select different subframe for use in sectors 52a-c by selecting different values for a particular random access parameter for each of sectors 52a-c. For example, managing node 34 may select values of "3," "4," and "5," respectively, for the PRACHConfigIndex of sectors 52a, 52b, and 52c corresponding to random access transmissions in Subframes #1, #4, and #7, respectively, in sectors 52a, 52b, and 52c.

If instead, managing node 34 determines that random access use also does not exceed its relevant thresholds in any (or in the predetermined number) of sectors 52a-c, operation of managing node 34 may proceed in any suitable manner. For example, in the illustrated embodiment, managing node 34 returns to step 402 without changing the configuration of base station 32a.

In the illustrated example, managing node 34 may be responsible for configuring base station 32a when managing node 34 determines a re-configuration is appropriate. In particular embodiments, this may involve transmitting configuration information to base station 32a, as shown at step 416. This configuration information indicates a selected subframe for random access transmissions in at least one of the sectors 52a-c served by base station 32a. For purposes of this example, the configuration information is assumed to specify a selected subframe for at least a first sector 52a.

When base station 32a receives configuration information, base station 32a may configure itself based on the received configuration information. (Steps that are performed by base station 32a, rather than managing node 32, in this example are indicated in FIGS. 4A-4B by dotted line boxes. However, in alternative embodiments these same steps or substitute steps may be performed by managing node 34, or some other element of wireless communication system 10, instead of base station 32a.) In particular embodiments, the process of base station 32a configuring itself may involve base station 32a setting local copies of one or more random access parameters for one or more of sectors 52a-c served by base station 32a based on the received configuration information at step 418. Additionally, as shown at step 420, base station 32a may transmit information to one or more wireless communication devices 20 served by base station 32a indicating a subframe for random access transmissions in any sector 52a-c for which the received configuration information specifies a random access subframe. For the illustrated example, this means base station 32a indicates to served wireless communication devices 20 a subframe for random access transmissions in at least the first sector 52a.

Once base station 32a has completed any necessary configuration and communicated any necessary information to served wireless communication devices 20, base station 32a may begin receiving transmissions from wireless communication devices 20 in accordance with its new configuration. Thus, in the illustrated embodiment, base station 32a receives a random access transmission from a wireless communication device 20 (here, wireless communication device 20a) in the first sector 52a during the subframe selected by managing node 34 for sector 52a, at step 422. Additionally, in the illustrated example, base station 32a schedules wireless communication device 20a to transmit a scheduled data transmission in sector 52a during a subframe other than the subframe selected for sector 52a by managing node 34, at step 424. Operation of managing node 34 and base station 32a with respect to configuring and re-configuring base station 32a may then continue indefinitely (with operation returning to, for example, step 402) as suggested by FIGS. 4A-4B or terminate at any appropriate time.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing communication in a wireless network, the method comprising:
determining a first value indicating a level of use for a scheduled data channel for one or more of a plurality of sectors served by a first base station, wherein determining the first value comprises determining a first set of values includes one or more of:

a transmission resource utilization value, wherein the transmission resource utilization value indicates a utilization rate for uplink transmission resources in one or more of the plurality of sectors;
a session time value, wherein the session time value indicates an amount of time associated with a plurality of sessions that have occurred in one or more of the plurality of sectors; and a connected user quantity, wherein the connected user quantity indicates a number of users connected to one or more of the plurality of sectors;
determining a second value indicating a level of use for a random access channel for one or more of the plurality of sectors served by the first base station;
selecting a respective subframe for random access transmissions for each of the sectors served by the first base station based on the first value and the second value; and
transmitting configuration information to the first base station, wherein the configuration information indicates a subframe selected for each of the sectors.

2. The method of claim 1, further comprising configuring the first base station based on the transmitted configuration information, wherein configuring the first base station comprises setting the respective subframe for random access transmissions in each of the sectors served by the first base station based on the transmitted configuration information.

3. The method of claim 2, further comprising:
transmitting system information in a first sector served by the first base station, wherein the system information indicates a subframe selected for random access transmissions in that sector;
receiving random access transmissions from a user equipment in the first sector during the selected subframe for the first sector; and
scheduling transmissions for user equipment in the first sector during at least one subframe other than the selected subframe for the first sector.

4. The method of claim 1, wherein selecting a respective subframe for each of the sectors served by the first base station comprises determining whether to set a respective subframe for random access transmissions in each of the sectors served by the first base station to the same subframe.

5. The method of claim 1, wherein determining the second value comprises determining a second set of values that includes one or more of:
an access attempt quantity, wherein the access attempt quantity indicates a number of access attempts that have occurred in one or more of the sectors over a predetermined time period; and
a handover attempt quantity, wherein the handover attempt quantity indicates a number of handover attempts that have occurred in one or more of the sectors over a predetermined time period.

6. The method of claim 1, wherein selecting the respective subframe for each of the cells neighboring the first site based on the first value and the second value comprises:
determining whether the first value exceeds a first threshold; and
in response to determining that the first value exceeds the first threshold, selecting the same subframe for random access transmissions for all of the sectors served by the first base station.

7. The method of claim 1, wherein selecting the respective subframe for each of the sectors served by the first base station based on the first value and the second value comprises:
determining whether the second value exceeds a second threshold; and
in response to determining that the second value exceeds the second threshold, selecting a different subframe for random access transmissions for each of the sectors served by the first base station.

8. The method of claim 1, wherein:
the scheduled data channel comprises a Physical Uplink Shared CHannel (PUSCH);
the random access channel comprises a Physical Random Access CHannel (PRACH); and
transmitting configuration information to the first base station comprises transmitting a PRACHConfigIndex parameter for each of the plurality of sectors to the first base station.

9. A management apparatus for managing communication in a wireless network, the apparatus comprising:
a processor adapted to:
determine a first value indicating a level of use for a scheduled data channel for one or more of a plurality of sectors served by a first base station, wherein the first value is determined by determining a first set of values includes one or more of:
a transmission resource utilization value, wherein the transmission resource utilization value indicates a utilization rate for uplink transmission resources in one or more of the plurality of sectors;
a session time value, wherein the session time value indicates an amount of time associated with a plurality of sessions that have occurred in one or more of the plurality of sectors; and
a connected user quantity, wherein the connected user quantity indicates a number of users connected to one or more of the plurality of sectors;
determine a second value indicating a level of use for a random access channel for one or more of sectors served by the first base station; and
select a respective subframe for random access transmissions for each of the sectors served by the first base station based on the first value and the second value; and
a communication interface adapted to transmit configuration information to the first base station, wherein the configuration information indicates a subframe selected for at least one of the sectors served by the first base station.

10. The apparatus of claim 9, wherein the processor is further adapted to select a respective subframe for each of the sectors served by the first base station by determining whether to set a respective subframe for random access transmissions in each of the sectors served by the first base station to the same subframe.

11. The apparatus of claim 9, wherein the processor is adapted to determine the second value by determining a second set of values that includes one or more of:
an access attempt quantity, wherein the access attempt quantity indicates a number of access attempts that have occurred in one or more of the sectors over a predetermined time period; and
a handover attempt quantity, wherein the handover attempt quantity indicates a number of handover attempts that have occurred in one or more of the sectors over a predetermined time period.

12. The apparatus of claim 9, wherein the processor is adapted to select the respective subframe for each of the sectors served by the first base station based on the first value and the second value by:
determining whether the first value exceeds a first threshold; and in response to determining that the first value exceeds the first threshold, selecting the same subframe for random access transmissions for all of the sectors served by the first base station.

13. The apparatus of claim 9, wherein the processor is adapted to select the respective subframe for each of the sectors served by the first base station based on the first value and the second value by:
   determining whether the second value exceeds a second threshold; and
   in response to determining that the second value exceeds the second threshold, selecting a different subframe for random access transmissions for each of the sectors served by the first base station.

14. The apparatus of claim 9, wherein
   the scheduled data channel comprises a Physical Uplink Shared CHannel (PUSCH);
   the random access channel comprises a Physical Random Access CHannel (PRACH); and
   the processor is adapted to transmit configuration information to the first base station by transmitting a PRACH-ConfigIndex parameter for each of the sectors to the first base station.

15. A system for managing wireless communication, comprising; a managing node adapted to: determine a first value indicating a level of use for a scheduled data channel for one or more of a plurality of served by a first base station, wherein the first value is determined by determining a first set of values includes one or more of:
   a transmission resource utilization value, wherein the transmission resource utilization value indicates a utilization rate for uplink transmission resources in one or more of the plurality of sectors;
   a session time value, wherein the session time value indicates an amount of time associated with a plurality of sessions that have occurred in one or more of the plurality of sectors; and
   a connected user quantity, wherein the connected user quantity indicates a number of users connected to one or more of the plurality of sectors;
   determine a second value indicating a level of use for a random access channel for one or more of the sectors served by the first base station; select a respective subframe for random access transmissions for each of the sectors served by the first base station based on the first value and the second value; and
   transmit configuration information to the first base station, wherein the configuration information indicates a subframe selected for at least a first sector served by the first base station; and the first base station adapted to receive the configuration information and to set a respective subframe for random access transmissions in the first sector based on the received configuration information.

16. The system of claim 15, wherein the base station is further adapted to:
   transmit system information in at least the first sector, wherein the system information indicates a subframe selected for random access transmissions in the first sector;
   receive random access transmissions from wireless communication devices in the first sector during the selected subframe for the first sector; and
   schedule transmissions for wireless communication devices in the first sector during at least one subframe other than the selected subframe for the first sector.

17. The system of claim 15, wherein the managing node is adapted to select a respective subframe for each of the sectors served by the first base station by determining whether to set a respective subframe for random access transmissions in each of the sectors to the same subframe.

18. The system of claim 15, wherein the managing node is adapted to determine the second value by determining a second set of values that includes one or more of:
   an access attempt quantity, wherein the access attempt quantity indicates a number of access attempts that have occurred in one or more of the sectors served by the first base station over a predetermined time period; and
   a handover attempt quantity, wherein the handover attempt quantity indicates a number of handover attempts that have occurred in one or more of the sectors served by the first base station over a predetermined time period.

19. The system of claim 15, wherein the managing node is adapted to select the respective subframe for each of the sectors served by the first base station based on the first value and the second value by:
   determining whether the first value exceeds a first threshold; and
   in response to determining that the first value exceeds the first threshold, selecting the same subframe for random access transmissions for all of the sectors served by the first base station.

20. The system of claim 15, wherein the managing node is adapted to select the respective subframe for each of the sectors served by the first base station based on the first value and the second value by:
   determining whether the second value exceeds a second threshold; and
   in response to determining that the second value exceeds the second threshold, selecting a different subframe for random access transmissions for each of the sectors served by the first base station.

21. The system of claim 15, wherein:
   the scheduled data channel comprises a Physical Uplink Shared CHannel (PUSCH);
   the random access channel comprises a Physical Random Access CHannel (PRACH); and
   the managing node is adapted to transmit configuration information to the first base station by transmitting a PRACHConfigIndex parameter for each of the sectors to the first base station.

* * * * *